May 15, 1923.

L. W. YONGE

LOCKING DEVICE FOR AUTOMOBILE STARTERS

Filed June 22, 1922

1,455,697

Inventor.
Laurie W. Yonge,

By Jas. L. Skidmore
his Attorney.

Patented May 15, 1923.

1,455,697

UNITED STATES PATENT OFFICE.

LAURIE W. YONGE, OF JACKSONVILLE, FLORIDA.

LOCKING DEVICE FOR AUTOMOBILE STARTERS.

Application filed June 22, 1922. Serial No. 570,078.

*To all whom it may concern:*

Be it known that I, LAURIE W. YONGE, a citizen of the United States, residing at Jacksonville, in the county of Duval and State of Florida, have invented certain new and useful Improvements in Locking Devices for Automobile Starters, of which the following is a specification.

This invention relates to new and novel means for automatically locking what is known as the "self-starting mechanism" for automobiles, and includes certain improvements on a similar device set forth in an application filed by me under date of February 11, 1922, Serial No. 535,756.

The prime object of the invention is to provide simple, economical, durable and effective means for automatically locking the starter pedal of an automobile during the operation of the motor and maintaining the pedal in its locked position until the motor entirely ceases its operating movements.

Another object of this invention is to so construct my novel device that when the motor is started by depressing the pedal, the motor exerts pressure within the oil air pressure gauge pipe of the automobile which forces the oil or air through a suitable connection therewith to the switch or pedal casing, thereby causing the pedal to be automatically locked against depression, in which condition the pedal will remain until the motor entirely ceases its operation, thus rendering it impossible for the driver to again depress the pedal to place the starter in gear until the motor shall have entirely ceased its motion.

The foregoing and such other objects as may appear from the ensuing description are accomplished by the construction, assembling, combination, arrangement and location of the parts hereinafter more fully described, illustrated in the accompanying drawings, and particularly pointed out in the claims appended hereto, it being understood that slight changes in the precise form, proportions and minor details of the construction may be resorted to without departing from the spirit or sacrificing any of the advantages of the invention.

In the accompanying drawings which form a part of the specification it will be seen that:—

Figure 1:
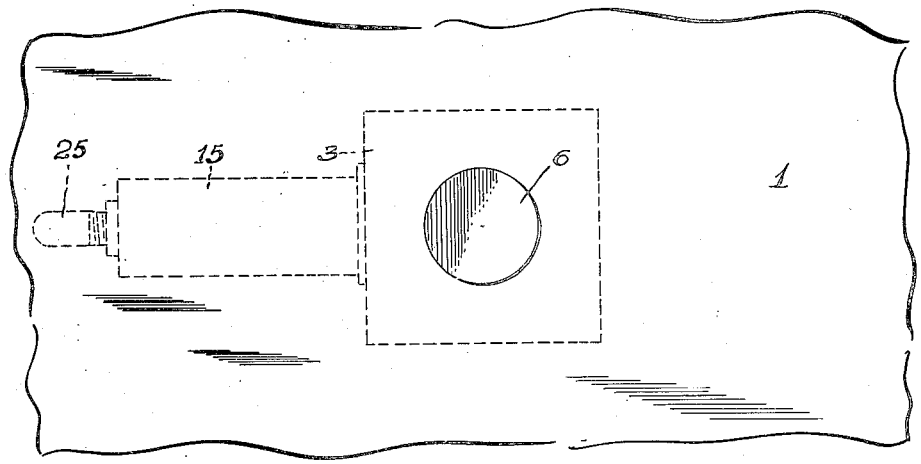
Figure 2:
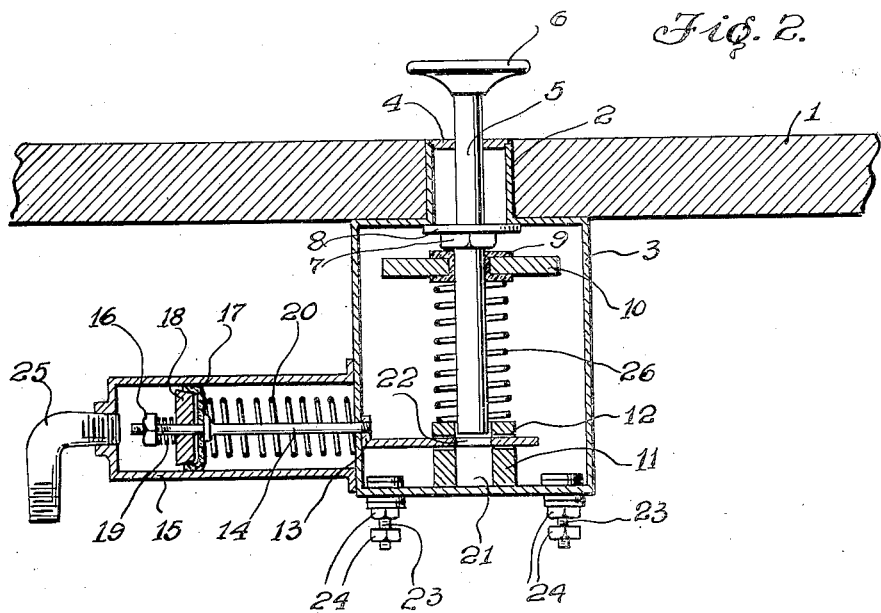

Figure 1 is a plan view of the device embodying my invention, showing the automobile flooring broken away, and Figure 2 is a sectional elevation showing the automobile flooring broken away, and showing in full lines a connection which is adapted to lead from a portion of the pedal casing to the oil air pressure gauge pipe of an automobile.

Similar numerals of reference are employed to designate like parts throughout the several figures of the drawings.

In the embodiment of my invention as illustrated it will be seen by reference to Fig. 2 that the flooring 1 of an automobile is provided with a circular opening for the reception of the contracted neck portion 2 of a metallic casing 3, the top or cover 4 of said neck portion being provided with a circular opening therethrough for the reception of a treadle spindle 5, which is provided with a suitable button or pedal 6 secured to the upper end thereof. Within the casing 3, which is fixedly secured to the lower face of the flooring, is the depending treadle spindle 5 to which is suitably fitted a nut 7 adapted to support a disk washer 8, the latter serving as a stop to limit the upward movement of said spindle, and loosely supported around said spindle between the insulating fibre 9 is a metal plate 10.

Rigidly secured to the inner face of the bottom portion of the casing 3 is a metallic locking member 11, formed with a slot 12 extending transversely therethrough for the reception of a horizontally disposed right angle locking plate 13 securely fitted to the threaded inner end of a piston rod 14, which rod extends laterally through an opening formed through one side of the casing 3 and into an oil or air pressure cylinder 15, the latter being fixedly secured to the outer side face of the casing, said rod 14 terminating with a threaded outer end to which is fitted a nut 16. Intermediate the length of rod 14 and near its outer end portion it is provided with a flexible expansible cup-shaped piston 17, and fitted around said rod and within the piston is a beveled piston expander 18, with a coiled spring 19 surrounding the rod having one end of said spring resting against the outer face of the expander and its other end seated in contact with the inner face of the nut 16. Surrounding said rod between the piston 17 and the outer face of the casing 3 is a coiled spring 20 with one end resting against the inner face of the piston and its other end seated in contact with the outer face of said casing for the purpose hereinafter described.

It will be perceived that the locking member 11 is provided with a circular opening 21 for the reception of the lower end of the spindle 5, which is adapted to pass through an opening 22 formed through the locking plate 13 when said plate is caused to register in vertical alinement with the spindle. Secured to the bottom portion of the casing 3 are suitable screw-threaded binding posts 23, each of said posts being provided with an electric wire (not shown) and securing nuts 24 for connecting the electric wiring to the electric motor starter, which latter forms no part of this invention.

Secured to the outer end of the cylinder 15 is a pipe connection 25 adapted to be suitably connected with the well known air oil pressure gauge pipe of the automobile (not shown).

It will thus be readily obvious that when the pedal is depressed while in the position shown in Fig. 2, it causes the lower end of the spindle 5 to contact with the bottom of the casing 3, thus establishing an electric circuit between the casing and an electric starter which starts the operation of the motor, said operation immediately forcing air or oil pressure through the connection 25 and into the outer end of the cylinder 14 in contact with the outer face of the expander 18, thereby forcing the expander inwardly and causing the piston 17 to be expanded against the inner wall of said cylinder, thus forcing the piston, piston rod and the locking plate inwardly against the tension of the coiled spring 20, causing the opening 22 in the plate 13 to be moved out of vertical alinement with the spindle 5, with the solid portion of said plate resting directly below and in the path of said spindle, in which position the said locking plate 13 will remain until the motor shall have ceased its operation, and when the motor is dead the pressure through the connection 25 will immediately be relieved and thus allow the locking plate 13, the piston and piston rod to resume the position shown in Fig. 2 by the tension of the coiled spring 20, and in position for another depression of the treadle for starting purposes when desired.

It will be seen that the lower portion of the spindle 5 is surrounded by a coiled spring 26, with one end of said spring resting in contact with the upper face of the locking member 11, and the other end of the spring seated against the lower face of the insulating fibre 9, said spring serving to restore the pedal and spring to their normal position when said pedal is released or free from pressure thereon.

While I have shown my novel device as being connected with the flooring of an automobile it will be readily apparent that the same mechanism operated in substantially the same manner may be easily connected with the dashboard of an automobile.

Having thus described my invention what I claim and desire to secure by Letters Patent is:

1. A pedal locking device of the character described, comprising a casing rigidly secured to the lower face of an automobile flooring, a spindle fitted within said casing, a locking member secured to the bottom of the casing, a locking plate within the casing and fitted to said member, and air or oil pressure means connected to the outer face of said casing for imparting a reciprocal movement to said locking plate.

2. A pedal locking device of the character described, comprising a casing secured to the lower face of an automobile flooring, a spindle fitted within said casing, a locking member secured to the inner lower face of the casing, a locking plate fitted within said locking member, a cylinder fixedly secured to the outer face of the casing, and pressure means connected with said cylinder adapted to impart a reciprocal movement to said locking plate.

3. A pedal locking device of the character described, comprising a casing having a contracted neck portion fitted within an opening formed through the flooring of an automobile, said casing being suitably secured to the underside of said flooring, a spindle fitted within said casing having a pedal secured to its upper end, a locking member fitted within the casing, a locking plate fitted through said member, a cylinder mounted on the outer face of the casing, and pressure means connected with said cylinder adapted to impart a reciprocal movement to said locking plate.

4. A pedal locking device of the character described, comprising a casing fixedly secured to the lower face of an automobile flooring, a spindle fitted within the casing provided with a pedal at its upper end, a locking member fitted within the casing having a vertical opening for the reception of said spindle and a transverse slot formed therethrough, a locking plate fitted within said transverse slot, and pressure means carried by the outer face of the casing adapted to impart a reciprocal movement to said locking plate.

5. A pedal locking device of the character described, comprising a casing secured to the lower face of an automobile flooring, a spindle fitted within said casing having a pedal at its upper end, a locking member secured to the lower inner face of said casing, said member having a vertical opening for the reception of the spindle and a transverse slot formed therethrough, a locking plate fitted through said member within the slot, a cylinder mounted on the outer face of the casing, a pressure pipe connected at the outer end of said cylinder, and pressure means carried by said cylinder adapted to impart a reciprocal movement to the locking plate.

6. A pedal locking device of the character described, comprising a casing secured to the lower face of an automobile flooring, a spindle fitted within said casing with a pedal at its upper end, a locking member secured within the casing having a vertical opening for the reception of said spindle and a transverse slot formed therethrough, a locking plate fitted transversely within said member, a cylinder mounted on the outer face of the casing, a pressure pipe fitted to the outer end of the cylinder, a piston rod connected to one end of the locking plate, a piston and piston expander carried by said rod, and pressure means within said cylinder adapted to impart a reciprocal movement to said locking plate.

7. A pedal locking device of the character described, comprising a casing secured to the lower face of an automobile flooring, a spindle fitted within said casing, a locking member secured within the casing and formed with a transverse slot therethrough, a locking plate fitted within the said member, a cylinder mounted on the outer face of the casing, a pressure pipe connected to the outer end of said cylinder, a piston rod connected to the locking plate, an expansible piston mounted on said rod, a piston expander mounted on the rod, a nut fitted to the outer end of said rod, a coiled spring mounted on the rod between said nut and expander, a spring surrounding the rod between the piston and said casing, and pressure means within said cylinder adapted to impart a reciprocal movement to said locking plate.

LAURIE W. YONGE.